Oct. 29, 1940.    H. F. BLOMMÉ    2,219,886
FISHING TACKLE
Filed Oct. 26, 1939
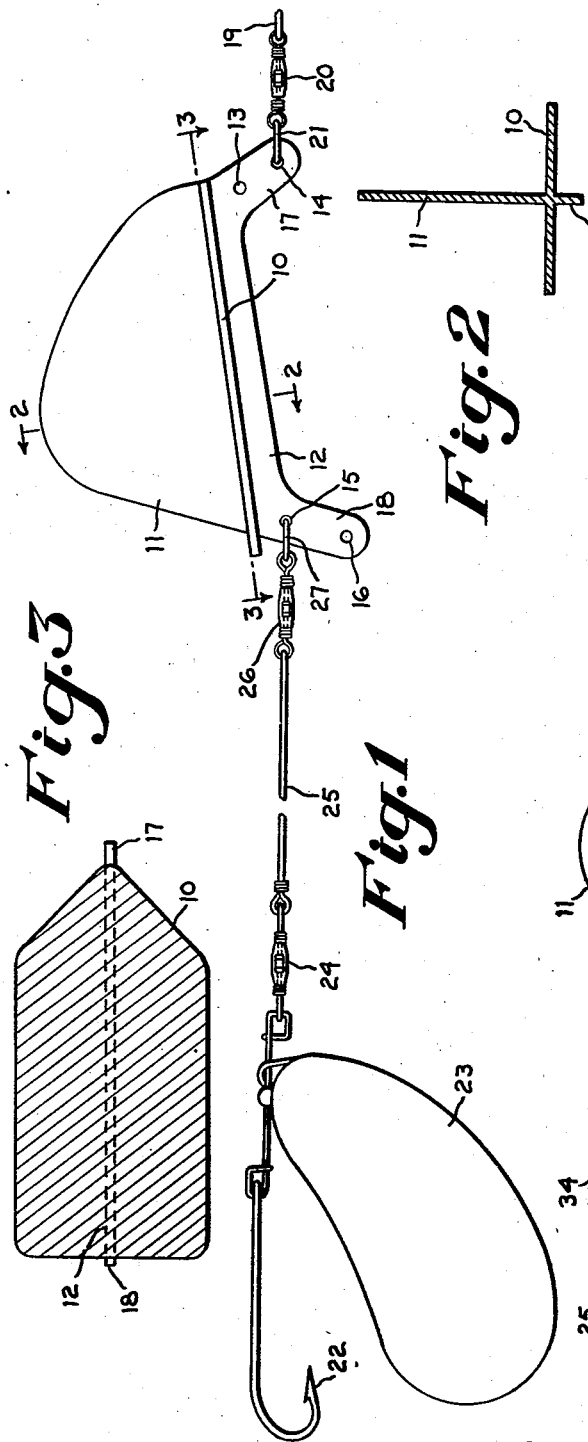
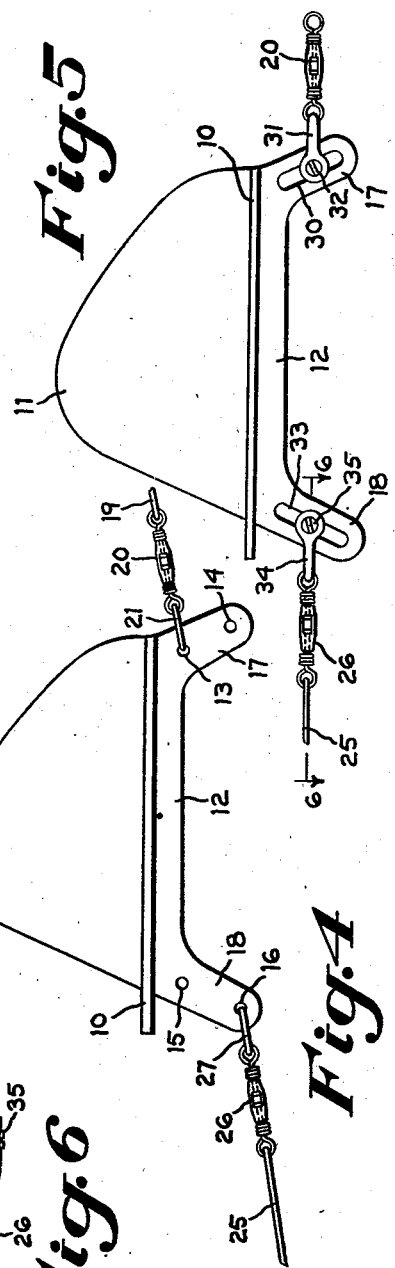
Inventor
HENRY F. BLOMME
By Harold W. Eaton
Attorney Patented Oct. 29, 1940

2,219,886

UNITED STATES PATENT OFFICE 2,219,886

FISHING TACKLE

Henry F. Blommé, Worcester, Mass.

Application October 26, 1939, Serial No. 301,461

6 Claims. (Cl. 43—42)

This invention relates to fishing tackle and more particularly to a fish line anti-twisting device.

One object of this invention is to provide a simple thoroughly practical anti-twisting device for use in trolling with a rotating type bait. Another object of the invention is to provide an anti-twisting device which is adapted both for surface and under-the-surface trolling. A further object of the invention is to provide a fish line anti-twisting device having horizontal and vertical fins. Another object is to provide readily adjustable means for adjusting the device for either surface trolling or under-the-surface or deep trolling.

This invention accordingly consists in the features of construction, combinations of elements and arrangements of parts, as will be exemplified in the structure to be hereinafter described, and the scope of the application of which will be indicated in the following claims.

In the accompanying drawing in which is illustrated one of many possible embodiments of the mechanical features of this invention, Fig. 1 is a side elevation of the fish line anti-twisting device attached to a rotating spoon type bait, showing the bait and fish line attached for surface trolling;

Fig. 2 is a cross sectional view, taken approximately on the line 2—2 of Fig. 1;

Fig. 3 is a horizontal sectional view, taken approximately on the line 3—3 of Fig. 1;

Fig. 4 is a side elevation of the anti-twisting device with the bait and fish line attached for under-surface or deep trolling;

Fig. 5 is a side elevation of the anti-twisting device, showing a modified construction in which adjustable line and bait attaching devices are provided; and Fig. 6 is a horizontal sectional view, taken approximately on the line 6—6 of Fig. 5.

In fishing by the trolling method, where a rotating bait, such as a rotating spoon or the like, is employed, the fishing line between the bait and the fish rod has a tendency to twist and kink due to the rotating of the whole or part of the bait. The fish line frequently becomes so badly twisted and kinked that it is necessary to stop fishing and to remove the twist from the line. The present invention seeks to eliminate this difficulty by the provision of an anti-twisting device whereby a rotating type bait may be employed without the resultant twisting of the fish line.

An anti-twisting device has been illustrated comprising a pair of flat intersecting plane members which are arranged at substantially right angles to each other. The device includes a substantially horizontal plane 10 and a vertically arranged thin flat fin 11. In the preferred construction, a vertical plane keel 12 is provided which is coplanar with the fin 11 and which projects below the plane 10 a distance considerably less than the height of the fin 11.

The device may be made of any suitable material, such as for example Celluloid, or other plastic molded resinoid materials of the "Bakelite" or other types. Or if desired the device may be made of aluminum or other sheet materials.

The bait and fish line are attached at points out of line with the axis of the device, that is, out of line with the axis or intersection of the plane 10 and the fin 11, and are preferably attached to the keel 12.

The action of the substantially horizontal plane 10 together with the fin 11 serve to prevent rotation of the device as it is drawn through the water in trolling either at slow or relatively fast speed. The fin 11 together with the keel 12 serve to guide the device in a straight line path when in use.

The keel 12, as shown in Figs. 1 and 4, is provided with attaching holes 13, 14, 15, and 16. The attaching holes 13 and 14 are formed in a downwardly extending fin 17 formed integral with the keel 12. The attaching holes 15 and 16 are formed in a downwardly extending fin 18 formed integral with the keel 12. If desired, the keel 12 may be eliminated entirely and the two downwardly projecting fins 17 and 18 may be formed integral with and projecting downwardly from the horizontal plane 10.

As shown in Fig. 1, a fish line 19 which extends from a fish rod (not shown) is attached to a swivel 20. The swivel 20 is connected by a split ring 21 with the attaching hole 14. A bait, of the rotating spoon type, comprising a hook 22 and a rotating spoon 23, is attached to a swivel 24. The swivel 24 is connected by a short piece of fish line or leader 25 with a swivel 26. The swivel 26 is connected by a ring 27 with the attaching hole 15.

When trolling with the anti-twisting device attached, as shown in Fig. 1, the substantially horizontal plane 10 is tilted up slightly at the forward end which tends to keep the bait on the surface of the water for surface trolling.

When it is desired to utilize the device for under-the-surface or deep trolling, the bait and the fish line are attached as indicated in Fig. 4. The line 19, the swivel 20, and the ring 21 are attached to the hole 13, and the bait and the leader 25 are attached by the ring 27 to the hole 16. This method of attaching tends to tilt the normally horizontal plane 10 down slightly at its forward end and serves to carry the bait below the surface of the water to facilitate under-the-surface or deep trolling.

A modified construction has been illustrated in Figs. 5 and 6 in which the line and the bait attaching devices are adjustable so that the position of the normally horizontal plane 10 may be readily adjusted without detaching from the anti-twisting device. The downwardly extending fin 17 is provided with an elongated slot 30. A substantially U-shaped clip 31 passes through the eye at the end of the swivel 20 (Fig. 5) and straddles the side faces of the arm 17. A screw 32 passes through an aperture in one side of the clip 31, passes through the elongated slot 30 and is screw threaded into the other side of the clip 31. By tightening the screw 32, the clip 31 may be clamped in any desired position with respect to the elongated slot 30.

The downwardly extending fin 18 is similarly provided with an elongated slot 33. A substantially U-shaped clip 34 passes through the eye at the end of the swivel 26 (Fig. 5) and straddles the side faces of the fin 18. A screw 35 passes through an aperture in one side of the clip 34, passes through the elongated slot 33 and is screw threaded into the other side of the clip 34. By tightening the screw 35, the clip 34 may be clamped in any desired position with respect to the elongated slot 33.

By adjusting the position of the clip 31 and the clip 34 in the elongated slots 30 and 33 respectively, the position of the normally horizontal plane 10 may be varied as it is drawn through the water. It may be positioned horizontal, tilted up in front for surface trolling, or tilted down in front for under-the-surface or deep trolling.

The operation of the anti-twisting device will be readily apparent from the foregoing disclosure. The device is attached at the end of a fish line, either a hand line or a fish line handled by means of a fish rod. A bait either of the spoon type, or any other bait or lure is attached at the other end of the device by means of a short leader. The assembled tackle is then ready for trolling through the water, the bait and the line being attached as above described for either surface or under-the-surface trolling, as desired.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. A fish line anti-twisting device for use with rotating type baits or lures comprising a horizontal plane, a vertical fin projecting above said plane, spaced fins which project downwardly below said horizontal plane, and means for attaching a fish line and a bait to said downwardly projecting fins.

2. A fish line anti-twisting device for use with the rotating type of baits or lures comprising a horizontal plane, a vertical fin projecting above said plane, a pair of spaced fins which project downwardly from the forward and rearward ends of said plane, and adjustable means for attaching a fish line and a bait to said downwardly projecting fins.

3. A fish line anti-twisting device for use with the rotating type of baits or lures comprising a horizontal plane, a vertical fin projecting above said plane, a vertical keel projecting below said plane, fins at the forward and rearward ends of said keel, and a plurality of attaching holes formed in each of said downwardly projecting fins whereby the device may be readily attached for either surface or under-the-surface trolling.

4. A fish line anti-twisting device for use with baits or lures comprising a horizontal plane, a vertical fin projecting above said plane, a vertical keel projecting below said plane, downwardly projecting fins at each end of said keel, elongated slots formed in each of said downwardly projecting fins, and adjustable fish line and bait attaching devices which are adjustable within said slots to facilitate adjustment of the position of the horizontal plane relative to the line and bait.

5. A fish line anti-twisting device for use with baits or lures comprising a horizontal plane, a vertical fin projecting above said plane, a vertical keel projecting below said plane, downwardly projecting fins at each end of said keel, elongated slots formed in each of said downwardly projecting fins, adjustable fish line and bait attaching devices which are adjustable within said slots, and means to clamp said attaching devices in adjusted position to facilitate adjustment of the position of the horizontal plane relative to the line and bait.

6. A fish line anti-twisting device for use with baits or lures comprising a plane, a fin projecting from one surface of said plane, a keel projecting from the other surface of said plane, and a fin projecting from each end of said keel.

HENRY F. BLOMMÉ.